United States Patent
Preusser et al.

[15] 3,673,081
[45] June 27, 1972

[54] PROCESS FOR SEPARATING SATURATED HYDROCARBONS AND OLEFINS

[72] Inventors: Gerhard Preusser, Essen; Martin Schulze, Neviges; Klaus Richter, Essen, all of Germany

[73] Assignee: Heinrich Koppers Geselschaft mit beschrankter Haftung, Essen, Germany

[22] Filed: Feb. 18, 1970

[21] Appl. No.: 12,190

[30] Foreign Application Priority Data

Feb. 19, 1967 Germany..................P 19 08 126.6

[52] U.S. Cl. ..........................208/313, 208/326, 260/677 A, 203/58
[51] Int. Cl............................................C10g 21/20
[58] Field of Search............208/313, 326; 260/677 A, 681.5; 23/58

[56] References Cited

UNITED STATES PATENTS

| | | | |
|---|---|---|---|
| 2,834,820 | 5/1958 | Bloch | 260/677 |
| 3,235,471 | 2/1966 | Clay | 260/677 |
| 3,434,936 | 3/1969 | Luther et al. | 208/313 |

Primary Examiner—Herbert Levine
Attorney—Michael S. Striker

[57] ABSTRACT

Process for separating saturated hydrocarbons and olefins from mixtures thereof, by subjecting such a mixture to an extractive distillation in the presence of a solvent selective for the olefins, whereby the solvent containing the separated olefin dissolved therein is subjected to a further distillation for separating the olefin from the solvent and the latter recycled back into the extractive distillation, wherein as selective solvent morpholine and/or a substituted morpholine is used.

10 Claims, 1 Drawing Figure

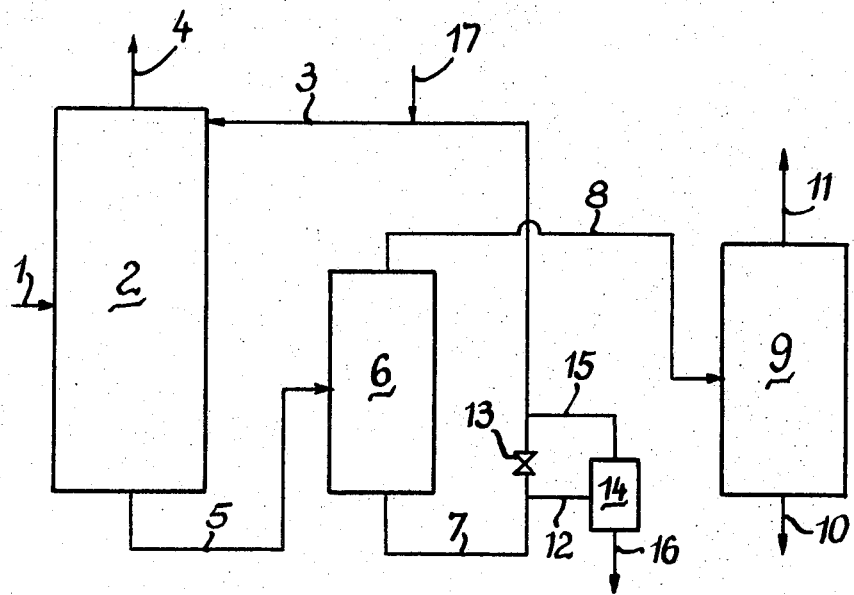

PROCESS FOR SEPARATING SATURATED HYDROCARBONS AND OLEFINS

BACKGROUND OF THE INVENTION

The present invention relates to a process for the separation of saturated hydrocarbons and olefins by extractive distillation under use of a solvent selective for the olefins, the solvent containing the olefin dissolved therein being thereafter subjected to a further distillation for separation of the olefins therein and the recovered solvent returned into the extractive distillation.

Processes of the aforesaid type have been known and used for sometime in the separation of paraffin-olefin mixtures, in connection with which different substances have been used as selective solvent for the extractive distillation. Thus, in practice, there have been used five-membered hydrogenated heterocyclics containing N- and/or 0-atoms as hetero-atoms and which in addition contain in their rings, a carbonyl group. Typical examples of this class of substances are the pyrrolidones, as well as their derivatives, such as, for instance, N-methyl- and N-hydroxyalkyl pyrrolidone. These materials have demonstrated, in the separation procedure, a relatively satisfactory separation action. However, under the conditions involved, there takes place in the extractive distillation a certain decomposition resulting in the formation of acid decomposition products. The acid decomposition products make themselves visible in that the parts of the equipment coming into contact with the solvent undergo considerable corrosion.

Moreover, the decomposition products render the olefin fractions recovered from the extract of the extractive distillation, impure and these olefin fractions must then, because of these impurities, be subjected to an additional procedure for removing the same.

SUMMARY OF THE INVENTION

It is therefore an object of the present invention to provide a selective solvent that will not produce the undesired corrosion of the equipment parts, but which will have as good, if not a better, selectivity for the olefin fraction than does the known solvent.

It is another object of the invention to provide a process which can be carried out to efficiently separate saturated hydrocarbons from olefins.

In accordance with the invention, the above and other objects are attained and saturated hydrocarbons separated from olefins by extractive distillation, when as selective solvent for the olefin fraction, there is used morpholine and/or substituted morpholine.

The substituted morpholine preferably contains a substituent containing one to seven carbon atoms. As examples of the latter compounds, there may be mentioned, N-formyl-2,6-dimethylmorpholine, N-formylmorpholine, N-hydroxyethylmorpholine, N-acetylmorpholine, and N-phenylmorpholine. The substituent can be of straight or branched or cyclic structure. The substituent can also contain heteratoms adjacent C atoms.

It is also possible to use substituted morpholine, the substituent of which consists entirely of heteroatoms, i.e., the substituent contains no carbon atoms. As an example of such a compound, there can be mentioned nitrosomorpholine.

The process of the invention carried out with morpholine and/or substituted morpholine as solvent is characterized by the decreased tendency of the solvent to undergo decomposition. In the process, accordingly, no acid or alkaline decomposition products are formed and as a result, no corrosion of the equipment is observed.

In carrying out the process of the invention, it is advantageous if an extractive distillation column without an external hydrocarbon reflux is used. This manner of carrying out the process is to be considered most surprising to the artisan experienced in carrying out distillation techniques, in that the separation in a column is sharper, the greater the reflux ratio is. Thorough investigation by the applicants herein, however, has established that in the case of the extractive distillation of the process of the invention, this belief is not applicable for the following reasons:

1. The reflux flowing downwardly in the extractive distillation column is distributed in the introduced solvent and thereby its selectivity is lowered, resulting in a decreased separation effect.

2. The reflux carried back into the extractive distillation column must be evaporated again requiring the provision of higher heat energy. Because of this, an increase in the sump temperature of the extractive distillation column also becomes necessary. As a result, there takes place a correspondingly increased olefin evaporation in the sump. As the olefin vapors have a correspondingly higher temperature, they are present in the column in increased amounts before they are condensed. This results just as in the case of the mixing of the solvent with the reflux, a decrease in the separation yield.

3. Because of the stronger heating and re-evaporation of the sump product, the holding time of the olefin in the sump is increased and therewith the harmful effects of the temperature increase. As a result, the tendency of these substances to form polymerizates is increased. The polymerizates favor, however, the tendency to foam formation in the extractive distillation column, which of course unfavorably influences the separating effect of the column.

As the separation of the saturated hydrocarbons and olefins partially require low boiling temperatures, it is to be understood that the extractive distillation can be carried out under normal as well as increased pressures. In certain cases, the extractive distillation can also be carried out under reduced pressures (vacuum). Through the use of vacuum, the sump temperature of the extractive distillation column is lowered and therewith the polymerization tendencies of the olefins present in the sump are lowered.

BRIEF DESCRIPTION OF THE DRAWING

The single FIGURE is a diagrammatic view of an apparatus which can be used in the practice of the process

DESCRIPTION OF THE PREFERRED EMBODIMENT

An embodiment of the process of the extractive distillation of the invention is illustrated in the drawing forming part of this disclosure. Referring to the drawing, the starting mixture to be separated is introduced through the line 1 into the middle portion of the extractive distillation column 2 which is provided with trays. The starting mixture is heated up to close to its boiling point prior to its entry into the column so that on its entry into the column, it is quickly evaporated. The starting mixture can also be introduced into the column in already vaporized form. The selective solvent is fed into the top of the extractive distillation column through line 3 and flows over the installed trays in the column from the top to the bottom, taking up the vaporized olefins. The saturated hydrocarbons are discharged through line 4 at the head of the column and can then be condensed in an after-arranged condensation vessel (not shown in the drawing). The liquid sump product comprising the selective solvent and the therein dissolved olefin is drawn off from the extractive distillation column through line 5 and delivered into column 6 where the olefin is separated from the selective solvent. The selective solvent is then taken off from the column sump through line 7 and delivered via the line 3 back into the extractive distillation column, while the olefin vapors are discharged from the head of the column 6 and delivered into column 9 through line 8.

In column 9, a further separation takes place. The higher boiling portion of the olefin fraction can for instance be taken off through the line 10 and the lower boiling fraction, for instance, the monoolefins removed via the line 11. The selective solvent which has been in circulation for some time can be purified by taking off a portion of the selective solvent in the region of the line 7 through the branch line 12 and delivering it to a regenerating installation 14. The regenerated solvent is than again via line 15 returned to the circulation, i.e., introduced therein through line 7, while the separated impurities are removed from the regenerator through line 16. Line 17 serves for the introduction of fresh solvent.

The process of the invention will now be illustrated by the following examples, but are not to be construed as being limited thereby.

The examples were carried out using for the separation, the following starting mixtures: propylene-propane, isobutane-butene, cyclohexene-cyclohexane and butane-butene. In all cases, even after prolonged operating times, no corrosion of any of the equipment was observed.

The data obtained in the examples are set out in the following Table:

TABLE

| Example No. | 1 | 2 | 3 | 4 |
|---|---|---|---|---|
| Analysis of starting mixtures. | 0.48 weight percent $C_1$-$C_2$. | 78.3 weight percent isobutane. | 89.3 weight percent cyclohexene. | 9.57 weight percent butane. |
|  | 94.04 weight percent propylene. | 17.4 weight percent isobutene. | 10.1 weight percent cyclohexane. | 0.83 weight percent isobutane. |
|  | 5.48 weight percent propane. | 4.3 weight percent butene 1+2. | 0.6 weight percent methylcyclopentane. | 4.12 weight percent isobutene. |
|  |  |  |  | 17.39 weight percent cis-butene 2. |
|  |  |  |  | 64.28 weight percent trans-butene 2. |
|  |  |  |  | 93.81 weight percent butene 1 |
| Selective solvent | N-hydroxypropylmorpholine | Dimethylmorpholine | N-acetylmorpholine | N-hydroxyethylmorpholine |
| Amt. of starting mixture thru line 1, kg | 33 | 26 | 39 | 31 |
| Temp. of introduction, °C | 18 | 24 | 64 | 24 |
| Amt. of solvent thru line 3, kg | 198 | 130 | 177 | 214 |
| Head temp., col. 2, °C | 31 | 66 | 91 | 70 |
| Sump temp., col. 2, °C | 64 | 90 | 110 | 95 |
| Pressure in col. 2, atm | 11 | 9 | (¹) | 10 |
| Amt. of saturated HCS drawn off thru line 4, kg | 2.26 | 20.13 | 5.1 | 3.67 |
| Head temp., col. 6, °C | 5 | 25 | 62 | 25 |
| Sump. temp., col. 6, °C | 32 | 81 | 189 | 75 |
| Pressure in col. 6, atm | 3 | 4 | 0.5 | 3 |
| Amt. olefin taken off thru line 8, kg | 30.74 | 5.87 | 33.9 | 27.33 |
| Purity of olefin fraction from line 8, percent | 99.903 | 95.75 | 99.56 | 99.86 |

¹ Normal pressure.

What is claimed is:

1. In the process of separating into its components, a mixture of a saturated hydrocarbon and an olefin selected from the group consisting of propylene and propane, butene and butane, i-butene and i-butane, and cyclohexene and cyclohexane by extractive distillation of such mixture, recovering the solvent containing the olefin, separating the olefin from the solvent by distillation and recycling the solvent to the extractive distillation, the improvement which comprises using at least one member selected from the group consisting of morpholine, N-formyl-2,6-dimethylmorhpoline, N-formylmorpholine, N-hydroxyethyl morpholine, N-hydroxypropyl morpholine, N-acetyl morpholine, N-phenyl morpholine and N-dimethyl morpholine.

2. Improvement according to claim 1 wherein said selective solvent is N-hydroxypropylmorpholine.

3. Improvement according to claim 1 wherein said selective solvent is dimethylmorpholine.

4. Improvement according to claim 1 wherein said selective solvent is N-acetylmorpholine.

5. Improvement according to claim 1 wherein said selective solvent is N-hydroxyethylmorpholine.

6. Improvement according to claim 1 which comprises using a mixture of selective solvents.

7. Improvement according to claim 1 which comprises carrying out said extractive distillation without external hydrocarbon reflux.

8. Improvement according to claim 1 wherein said olefin is propylene and said hydrocarbon is propane.

9. Improvement according to claim 1 wherein said olefin is butene and said hydrocarbon is butane.

10. Improvement according to claim 1 wherein said olefin is butene and said hydrocarbon is isobutane.

* * * * *